3,629,431
USE OF 1-ALKYLSULFONYLALKYL-2-ALKYL-5 - NITROIMIDAZOLES IN CONTROLLING COCCIDIOSIS

Max W. Miller, Stonington, Conn., assignor to Pfizer Inc., New York, N.Y.
No Drawing. Filed June 16, 1969, Ser. No. 833,730
Int. Cl. A61k 27/00
U.S. Cl. 424—273     10 Claims

ABSTRACT OF THE DISCLOSURE

The use of compounds of the formula:

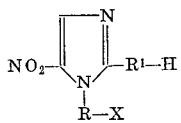

wherein R and $R^1$ are each alkylene having 1 to 7 carbon atoms and X is lower alkylsulfonyl, for the control of coccidiosis is described.

BACKGROUND OF THE INVENTION

This invention relates to the use of various 1-alkylsulfonylalkyl - 2 - alkyl - 5 - nitroimidazoles in controlling coccidiosis.

Coccidiosis is the generic term given to an intestinal disease caused by the destruction of the intestinal mucosa by various coccidia, in particular those belonging to the genera Eimeria and Isospora. It appears that the parasites are host specific, with each species usually occurring in a single host. The disease is widespread among domestic animals, such as cattle, sheep, rabbits, dogs, cats, and poultry and is characterized by diarrhea, hemorrhage, emaciation and death.

The disease causes severe losses in the poultry industry, particularly among young chickens. In the past, the sulfonamides, e.g., sulfaguanidine have been among the therapeutic agents of choice.

SUMMARY OF THE INVENTION

This invention provides a method of controlling coccidiosis in poultry which comprises administering an anticoccidial amount of a compound having the formula:

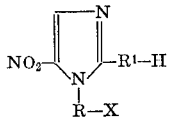

where R and $R^1$ are each alkylene having from 1 to 7 carbon atoms and X is lower alkylsulfonyl; and their pharmaceutically-acceptable acid addition salts.

This invention also provides an anticoccidial composition comprising a poultry feed having dispersed therein at least about 0.05–0.10% by weight of a compound having the formula above.

DETAILED DESCRIPTION OF THE INVENTION

We have now found that various 1-alkylsulfonylalkyl-2-alkyl-5-nitroimidazoles are effective in controlling coccidiosis. These compounds have previously been described in U.S. Pat. 3,376,311. Besides the methods of preparation given there, another synthetic scheme that can be used for the preparation of these compounds is given below:

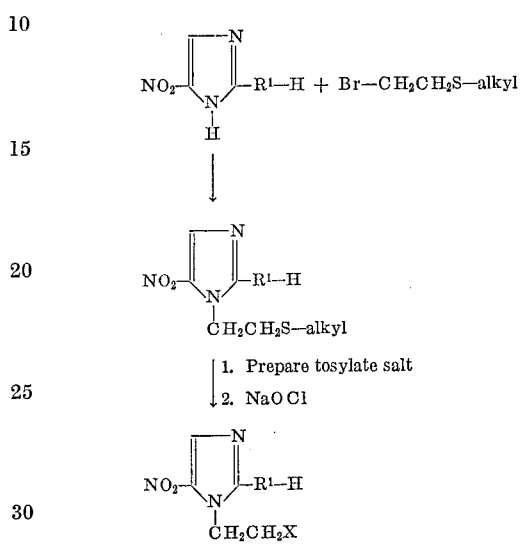

$R^1$=alkylene having 1 to 7 carbon atoms
X=lower alkylsulfonyl

In the above procedure the appropriate 2-alkyl-5-nitroimidazole and β-bromoethyl alkyl sulfide is reacted in formic acid to give the corresponding alkyl[2-(2-alkyl-5-nitro-1-imidazolyl)ethyl]sulfide, which is then converted to the tosylate salt. Oxidation of the tosylate salt with NaOCl in chloroform affords the desired alkyl[2-(2-alkyl-5-nitro-1-imidazolyl)ethyl]sulfone.

The necessary β-bromoethyl alkyl sulfides are conveniently prepared by reacting ethyl mercaptan, bromine, and ethylene in carbon tetrachloride at low temperatures.

In view of the fact that the compounds of this invention are basic in nature, they will form water-soluble salts with the appropriate acids. Although such salts must be pharmaceutically acceptable, since the final products are intended for animal consumption, it is possible to convert the desired compound to a pharmaceutically unacceptable salt and subsequently convert the latter salt to the free organic compound by treatment with a base; the imidazole so obtained is then converted to a pharmaceutically acceptable acid addition salt thereof in the manner hereinafter indicated.

For instance, the acid addition salts of the compounds of this invention can be prepared by treating free base with a substantially equivalent amount of the chosen acid in an aqueous solution or in a suitable organic solvent such as methanol or ethanol. Upon careful evaporation of the solvent, the solid salt is obtained. Alternatively, other recovery techniques are also applicable, such as freeze-drying when the solvent is water or the use of an anti-solvent in the case of an organic solution, e.g., the addition of diethyl ether to an ethanolic solution of the product will cause precipitation of the desired product to occur.

The acids which are used to prepare the pharmaceutically acceptable acid addition salts of this invention must, of course, be those which necessarily form non-toxic acid addition salts containing a pharmaceutically acceptable anion, such as the hydrochloride, hydrobromide, hydriodide, nitrate, sulfate or bisulfate, phosphate or acid phosphate, acetate, lactate, citrate or acid citrate, tartrate or bitartrate, oxalate, succinate, maleate, gluconate, saccharate, methanesulfonate, ethanesulfonate, benzenesulfonate and p-toluenesulfonate salts, etc.

The compounds of the present invention have been found to be effective in controlling coccidiosis in various domestic animals, particularly poultry. The compounds can be administered to the animals in their drinking water or as an addition to their feed. Uniform dispersion of the compound is readily effected by conventional mixing methods well known to those skilled in the art. For the treatment of poultry, excellent results are obtained with conventional feeds containing from 0.05% to 0.10% by weight of the imidazole. Obviously, the optimum percentage level will depend upon the activity of the particular compound being used.

In some cases it might be preferred to incorporate the anticoccidial agent in a feed supplement rather than in the final finished feed product. The carrier vehicle in such cases should be inert towards the imidazole and compatible with the remaining ingredients of the animal feed. These feed supplements, which contain a higher percentage of coccidiostat than does the finished feed, are mixed with or blended into the foodstuff. In order to insure uniform dispersion of the active compound in the finished feed it may be desirable to employ an intermediate blending step in which the supplement is first blended with a portion of the final feed followed by the addition of the remainder of the feed with adequate mixing. Among the constituents normally employed for these feed supplements are distilled dried grain, corn meal, ground oyster shells, and soybean meal.

(I) Preparation of starting materials (A) Preparation of 2-alkyl-5-nitroimidazoles.—To 300 ml. of 98% $H_2SO_4$ was added 136 g. (1.66 moles) of 2-methylimidazole, allowing the temperature to rise to 132°. To this hot solution was added a total of 240 ml. of 70% $HNO_3$ at such a rate as to maintain a reaction temperature of 150-170°. After the addition of $HNO_3$ was completed the mixture was stirred for 1.5 hours at ambient temperature, cooled and poured over ice. The pH was adjusted to 6.0, and the product collected by filtration to yield 305 g. (45.2% of theory) of 2-methyl-5-nitroimidazole; M.P. 250-252°.

Using the above procedure and the appropriately substituted 2-alkylimidazoles the following 2-alkyl-5-nitroimidazoles are similarly prepared:

2-n-heptyl-5-nitroimidazole
2-n-butyl-5-nitroimidazole
2-i-propyl-5-nitroimidazole
2-n-pentyl-5-nitroimidazole (B) Preparation of β-bromoethyl alkyl sulfides To a solution of 400 ml. of $CCl_4$ and 141 g. (2.27 moles) of ethyl mercaptans which was cooled to —16° was added 359 g. (2.27 moles) of $Br_2$ in 360 ml. $CCl_4$ so that the temperature of the mixture did not exceed —10°. The resulting mixture was sparged for 20 hours with $N_2$ then cooled again to —14°. Next 81.2 g. (2.9 moles) of ethylene was added, maintaining a temperature of 0° or less. After the ethylene had been added the reaction was left at ambient temperature for 20 hours, the solvent stripped and the residue distilled to yield 239 g. of β-bromoethyl ethyl sulfide (62.5% of theory), B.P. 68° (18 mm.).

Using the appropriate alkyl mercaptans, the following β-bromoethyl alkyl sulfides are also prepared:

β-bromoethyl-n-propyl sulfide
β-bromoethyl-n-methyl sulfide
β-bromoethyl-i-propyl sulfide
β-bromoethyl-n-butyl sulfide
β-bromoethyl-n-pentyl sulfide
β-bromoethyl-i-butyl sulfide (II) Preparation of 1-alkylsulfonylalkyl-2-alkyl-5-nitroimidazoles (A) Preparation of ethyl[2-(2-ethyl-5-nitro-1-imidazolyl)ethyl]sulfide tosylate.—A solution of 178 ml. of $CH_3COOH$ and 250 g. (1.96 mole) of 2-methyl-2-nitroimidazole was heated to 90°. Then 166 g. (0.98 mole) of β-bromoethyl ethyl sulfide was added and the mixture held at 90° for 1.5 hours. The $CH_3COOH$ was removed at reduced pressure, and the residue quenched in 260 ml. of water. The unreacted 2-methyl-5-nitroimidazole was removed by filtration, and the pH of the aqueous phase adjusted to 7.0. The product was extracted with $CHCl_3$, which after drying and concentration gave 166 g. of an oil. The oil was extracted with ether and the extract concentrated to yield 130.7 g. of product still contaminated with the 4-nitro isomer. The mixture was dissolved in 120 ml. ethyl acetate and added to 556 g. of p-toluenesulfonic acid in 20 ml. ethyl acetate. On cooling to —2°, ethyl[2-(2-methyl-5-nitro-1-imidazolyl)ethyl]sulfide tosylate precipitated and was collected to yield 126 g. (33% of theory), M.P. 112–114°.

(B) Preparation of ethyl[2-(2-methyl-5-nitro-1-imidazolyl)ethyl]sulfone.—A mixture of 530 ml. of $H_2O$, 126 g. (0.326 mole) of tosylate salt from the preceding procedure A above and 200 ml. $CHCl_3$ was cooled to 7°, and 136 ml. of 12.5% NaOCl was added in one portion. The resulting mixture was stirred for 15 minutes, then extracted with $CHCl_3$. The combined extracts were washed with saturated $NAHCO_3$, and the $CHCl_3$ replaced with isopropyl alcohol. The solids were collected and dried to yield 39 g. (48% of theory), M.P. 125–126°.

The 2-alkyl-5-nitroimidazoles in Part (I) (A) are reacted with the β-bromoethyl alkyl sulfides in Part (I) (B) according to the procedure of Part (II) (A), and the resulting tosylates are then converted to the sulfones according to the procedure of Part (II) (B).

(III) Preparation of the acid addition salts of the 1-alkylsulfonylalkyl-2-alkyl-5-nitroimidazoles The 5-nitroimidazole compounds described herein are converted to their acid addition salts by the following general procedure.

To a methanolic solution containing 0.10 mole of the 5-nitroimidazole is added 0.1 mole of a suitable acid. The solvent is removed by evaporation under reduced pressure or lyophilization and the solid acid addition salt is filtered and dried. Among the acids that can be used in this procedure are hydrochloric acid, acetic acid, sulfuric acid, citric acid and oxalic acid. Other suitable solvents are should not be construed to be limitations thereof.

The following examples are provided to illustrate more fully the scope of the present invention; however, they should not be construed to be limitations thereof.

Example I.—Groups of five nine-day old Barred Rock Cross strain cockerels are fed a basal ration into which the test compound is incorporated at various concentrations. The basal ration, a commercial chick starter (Purina Commercial Chick Starter, available from the Ralston Purina Co., St. Louis, Mo.), having the following composition, is presented ad libitum to the chicks 24 hours before infection and continuously thereafter throughout the course of the tests.

BASAL RATION COMPOSITION

| | Percent |
|---|---|
| Crude protein not less than | 18.0 |
| Crude fat not less than | 3.0 |
| Crude fiber not more than | 6.0 |
| Added minerals not more than | 3.5 | supplied by the following ingredients:

Meat and bone meal, fish meal, soybean meal, ground barley, ground oats, ground yellow corn, dehydrated alfalfa meal, wheat middlings, vitamin $B_{12}$ supplement, ethoxyquin (a preservative), animal fat preserved with BHA [1], choline chloride, niacin, vitamin A supplement, riboflavin supplement, calcium pantothenate, D activated animal sterol, vitamin E supplement, menadione sodium bisulfite (source of vitamin K activity),[2] calcium carbonate, low fluorine rock phosphate, iodized salt, manganese sulfate, manganous oxide, copper sulfate, zinc oxide.

Twenty-four hours after initiation of the medication, the chicks were inoculated orally with 200,000 sporulated oocysts (Eimeria tenella) and the average weight per bird per group determined. In addition, a group of ten chicks is fed the basal ration which contains none of the test compound (infected, untreated controls). A further group of ten chicks serves as uninfected, untreated controls. The chicks are examined on the fifth and sixth day post-infection for signs of hemorrhage. On the eighth day post-infection, the average body weight per bird per group is determined, the birds necropsied, the cecum examined microscopically, and a pathology index (average degree of infection) [A.D.I.] determined. Chicks which die prior to the fifth day post-infection are considered as toxic deaths. Those which die five days post-infection or later are considered as deaths due to disease. The efficacy of the test compound is judged by the prevention of mortality and by comparison of the pathologic index with that of the unmedicated infected controls. The degree of pathologic involvement at necropsy is expressed as the average degree based on the following scheme: 0=no cecal lesions; 1= slight lesions; 2=moderate lesions; 3=severe lesion; 4= death.

The concentration of test compound in the feed which will control pathology to the degree which allows normal weight gains relative to the uninfected, untreated controls, is referred to as the minimum effective concentration (MEC).

An alternative test procedure is to administer the test compound by syringe, rather than in the feed. The minimum effective dose (MED) is then determined. As with the MEC, the MED is the lowest concentration which will allow normal pathology and permit normal weight gains relative to the infected, untreated controls.

Typical results are given in the table below.

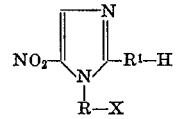

| R | $R^1$ | X | MEC (percent) | MED (mg./kg.) |
|---|---|---|---|---|
| $CH_2CH_2$ | $CH_3$ | $C_2H_5SO_2$ | 0.10 | |
| $CH_2CH_2$ | $CH_2$ | $n-C_3H_7SO_2$ | >0.05 | >228 |
| $CH_2CH_2$ | $CH_2$ | $CH_3SO_2$ | 0.05 | 228 |
| $CH_2CH_2$ | $CH_2$ | $i-C_3H_7SO_2$ | >0.10 | |
| $(CH_2)_3$ | $CH_2$ | $CH_3SO_2$ | >0.05 | >287 |

Example II.—Various levels of the compounds described herein are thoroughly blended into a nutritionally balanced diet having the composition shown below to provide feeds containing 0.0015%, 0.001%, 0.0025%, 0.005%, 0.01%, 0.025%, 0.05%, and 0.1%, respectively, of the active agent.

| | Percent |
|---|---|
| Ground yellow corn | 51.28 |
| Soybean oil meal (51%) | 38.15 |
| Corn oil | 6.10 |
| $CaCO_3$ | 1.20 |
| Dicalcium phosphate | 1.35 |
| Salt | 0.61 |
| Delamix (commercially available mineral mix containing $CaCO_3$ and small amounts of iron, zinc, manganese, and so forth, salts. Limestone Products Corporation of America, New Jersey) | 0.1 |
| Vitamin A (5305 I.U./lb.) | 0.1 |
| Vitamin $D_3$ (681 I.C.U./lb.) | 0.05 |
| Klotogen F (commercially available form of vitamin K, Abbott Laboratories) | 0.0003 |
| Pyridoxine hydrochloride | 0.0006 |
| D.I.-methionine | 0.140 |
| Niacin U.S.P. | 0.0025 |
| Choline chloride (25%) | 0.2 |
| Riboflavin | 0.06 |
| Calcium pentothenate (45%) | 0.002 |
| Myvanix (commercially available form of vitamin E) | 0.005 |

Such feeds, when administered ad libitum to chicks and to medium-sized turkey poults are effective in controlling coccidial infections.

Example III.—An effective feed composition for treating coccidiosis in cattle can be prepared with the following ingredients:

| | Parts |
|---|---|
| Ground corn | 90 |
| Soybean oil meal | 9 |
| Ground limestone | 0.5 |
| Salt | 0.5 |

The above feed is mixed with trace amounts of essential minerals and vitamins and sufficient amounts of the compounds of the present invention to provide a feed composition containing from 0.05 to 0.10% by weight of the active compound.

The resultant feed compositions provide effective products for the treatment and control of coccidiosis in cattle.

Example IV.—A useful feed composition for the treatment of coccidiosis in swine is prepared from the following ingredients:

| | Parts |
|---|---|
| Corn meal | 80 |
| Soybean oil meal | 16 |
| Meat and bone scrap | 2.5 |
| Oyster shell flour | 0.5 |
| Bone meal | 0.5 |
| Salt | 0.5 |

Trace amounts of essential minerals and vitamins are also added. The final feed is mixed with sufficient amounts of the compounds of the present invention to provide 0.05 to 0.10% by weight of active compound. The resultant feed compositions are effective in treatment and control of coccidiosis in swine.

What is claimed is:

1. The method of controlling coccidiosis in animals which comprises orally administering to an animal susceptible to coccidiosis infection an anticoccidial amount of a compound having the formula:

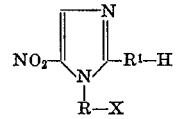

wherein R and $R^1$ are each alkylene having 1 to 7 carbon atoms; X is lower alkylsulfonyl and the pharmaceutically-acceptable acid addition salts thereof.

---

[1] BHA=butylated hydroxyanisole.
[2] Menadione sodium bisulfite=2-methyl-1,4-naphthaquinone sodium bisulfite.

2. The method of claim 1 wherein said compound is such that R is alkylene having 1 to 7 carbon atoms, X is lower alkylsulfonyl and $R^1$ is methylene.

3. The method of claim 1 wherein said compound is such that R is ethylene; X is ethylsulfonyl and $R^1$ is methylene.

4. The method of claim 1 wherein said compound is such that R is ethylene, X is propylsulfonyl and $R^1$ is methylene.

5. The method of claim 1 wherein said compound is such that R is ethylene, X is methylsulfonyl and $R^1$ is methylene.

6. An anticoccidial composition which comprises a poultry feed having dispersed therein about 0.05–0.10% by weight of a compound having the formula:

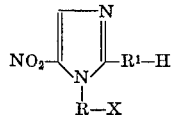

wherein R and $R^1$ are each alkylene having 1 to 7 carbon atoms; X is lower alkylsulfonyl and the pharmaceutically-acceptable acid addition salts thereof.

7. The anticoccidial composition as claimed in claim 6 wherein said compound is such that R is alkylene having 1 to 7 carbon atoms, X is lower alkylsulfonyl and $R^1$ is methylene.

8. The anticoccidial composition as claimed in claim 6 wherein said compound is such that R is ethylene, X is ethylsulfonyl and $R^1$ is methylene.

9. The anticoccidial composition as claimed in claim 6 wherein said compound is such that R is ethylene, X is propylsulfonyl and $R^1$ is methylene.

10. The anticoccidial composition as claimed in claim 6 wherein said compound is such that R is ethylene, X is methylsulfonyl and $R^1$ is methylene.

References Cited

UNITED STATES PATENTS 3,399,211  8/1968  Sarett et al. _____ 424—273

SAM ROSEN, Primary Examiner

PO-1050
(5/69)

UNITED STATES PATENT OFFICE
CERTIFICATE OF CORRECTION

Patent No. 3,629,431     Dated December 21, 1971

Inventor(s) Max W. Miller, assignor to Pfizer Inc., New York, N. Y.

It is certified that error appears in the above-identified patent and that said Letters Patent are hereby corrected as shown below:

Col. 4, line 63, "should not be construed to be limitations thereof." should read -- ethanol, water, and mixtures thereof. --

Signed and sealed this 30th day of May 1972.

SEAL)
ttest:

DWARD M. FLETCHER, JR.     ROBERT GOTTSCHALK
ttesting Officer     Commissioner of Patents